US010043377B2

(12) United States Patent
Wada et al.

(10) Patent No.: US 10,043,377 B2
(45) Date of Patent: *Aug. 7, 2018

(54) MONITORING SYSTEM

(71) Applicant: Panasonic Intellectual Property Management Co., Ltd., Osaka (JP)

(72) Inventors: Nobuyuki Wada, Fukuoka (JP); Hiroshi Tsuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 15 days.

This patent is subject to a terminal disclaimer.

(21) Appl. No.: 14/680,924

(22) Filed: Apr. 7, 2015

(65) Prior Publication Data

US 2016/0148492 A1    May 26, 2016

(30) Foreign Application Priority Data

Nov. 21, 2014  (JP) .................. 2014-237045

(51) Int. Cl.
G08B 25/10  (2006.01)
G08B 25/08  (2006.01)
(Continued)

(52) U.S. Cl.
CPC ....... *G08B 25/10* (2013.01); *G08B 13/19684* (2013.01); *G08B 25/08* (2013.01); *H04N 7/181* (2013.01); *G08B 13/19656* (2013.01); *G08B 13/19658* (2013.01); *G08B 13/19669* (2013.01); *G08B 13/19695* (2013.01); *G08B 13/19697* (2013.01)

(58) Field of Classification Search
CPC ................. H04N 7/18; G08B 25/10
See application file for complete search history.

(56) References Cited

U.S. PATENT DOCUMENTS 8,675,071 B1 *  3/2014  Slavin .................... H04M 11/04
                                                     348/143
2005/0197061 A1 *  9/2005  Hundal ............... H04M 1/6033
                                                     455/41.2

(Continued)

FOREIGN PATENT DOCUMENTS

JP    2004-145652 A    5/2004
JP    2007-025855 A    2/2007
(Continued)

OTHER PUBLICATIONS

International Search Report and Written Opinion dated Jul. 29, 2015, for corresponding International Application No. PCT/JP2015/001297, 17 pages.

(Continued)

*Primary Examiner* — Zhubing Ren
(74) *Attorney, Agent, or Firm* — Seed IP Law Group LLP

(57) ABSTRACT

A monitoring system includes at least one sensor, at least one monitoring camera, a master device that is connected to a fixed telephone network so as to perform calls to other fixed telephones, and a mobile phone terminal that is connected to other mobile phones via a mobile phone network. The master device records an image captured by the monitoring camera or outputs warning information depending on whether or not an event is detected by at least two of the sensors and the monitoring cameras.

17 Claims, 11 Drawing Sheets

(51) Int. Cl.
*H04N 7/18* (2006.01)
*G08B 13/196* (2006.01)

(56) References Cited

U.S. PATENT DOCUMENTS

| | | | |
|---|---|---|---|
| 2009/0189771 A1* | 7/2009 | Liu | G08B 21/0476 340/573.1 |
| 2011/0102588 A1* | 5/2011 | Trundle | G08B 13/196 348/143 |
| 2012/0314901 A1* | 12/2012 | Hanson | A61B 5/1117 382/103 |
| 2014/0218517 A1 | 8/2014 | Kim et al. | |

FOREIGN PATENT DOCUMENTS

| | | | |
|---|---|---|---|
| JP | 2007-323533 A | 12/2007 |
| JP | 2013-236393 A | 11/2013 |

OTHER PUBLICATIONS

Raty et al., "Testing and Validation of a Multi-sensor Distributed Surveillance Systems," Proceedings of the 7th International Caribbean Conference on Devices, Circuits and Systems, Mexico, Apr. 28-30, 2008, 6 pages.

* cited by examiner

FIG. 10

| CAMERA (OUTDOOR-DOOR) | SENSOR 1 (ENTRANCE) | SENSOR 2 (LIVINGROOM) | SENSOR 3 (BEDROOM) | SENSOR 4 (SECONDFLOOR) | OPERATION | REMARK |
|---|---|---|---|---|---|---|
| ○ | | | | | RECORDING | RECORD AT ONCE |
| ○ | ○ | | | | NON-EXECUTION | REGULAR ROUTE |
| ○ | | ○ | | | RECORDING+ALERT | ENTER FROM HALFWAY |
| ○ | | | ○ | | RECORDING+ALERT | ENTER FROM HALFWAY |
| ○ | | | | ○ | RECORDING+ALERT | ENTER FROM HALFWAY |
| | | ○ | | | ALERT | ENTER FROM HALFWAY |
| | | | ○ | | ALERT | ENTER FROM HALFWAY |
| | | | | ○ | ALERT | ENTER FROM HALFWAY |

TB1

MONITORING SYSTEM

BACKGROUND

Technical Field

The present invention relates to a monitoring system.

Description of the Related Art

In the related art, there is a monitoring system using a camera, a sensor, and the like (for example, refer to Japanese Patent Unexamined Publication No. 2007-323533). The monitoring system includes a monitoring device and a monitoring server.

The monitoring device includes image capturing means, sound input and output means, and target recognition means such as a human sensor. The image capturing means captures an image of a monitoring target in a monitoring space. The sound input and output means outputs sound to the monitoring target and receives sound from the monitoring target. The target recognition means outputs a target recognition signal when the monitoring target is recognized.

The monitoring server includes reception means, acquisition means, and communication means. The reception means receives the target recognition signal from the monitoring device. The acquisition means acquires video information captured by the image capturing means and audio information obtained through the sound input by the sound input and output means on the basis of the reception of the target recognition signal by the reception means. The communication means transmits a connection request to an information terminal of a registered user in a case where the target recognition signal is received by the reception means. The communication means transmits the video information and the audio information acquired by the acquisition means to the information terminal by using bidirectional communication between the monitoring device and the information terminal, established when the information terminal responds to the connection request, and receives video information and audio information from the information terminal and transmits the information to the monitoring device.

BRIEF SUMMARY

In Japanese Patent Unexamined Publication No. 2007-323533, a dedicated system is necessary as a monitoring system, and a lot of labor and cost are required to introduce a monitoring system. If detection accuracy of a sensor is low, a target (for example, a person) is recognized on the basis of detection performed by a single sensor (a human sensor or the like), monitoring accuracy may be reduced, and thus security may deteriorate.

The present invention has been made in consideration of the circumstances, and provides a monitoring system, which is convenient to use, and which can improve security at low cost by using an existing fixed telephone.

According to the present invention, there is provided a monitoring system including at least one sensor; at least one monitoring camera that includes a microphone, a speaker, and an image capturing unit; a master device that performs calls to the monitoring camera and the sensor, and is connected to a fixed telephone network so as to perform calls to other fixed telephones; and a mobile phone terminal that performs wireless communication with the master device by using a wireless router, and is connected to other mobile phones via a mobile phone network, in which the master device records an image captured by the monitoring camera or outputs warning information depending on whether or not an event is detected by at least two of the sensors and the monitoring cameras.

According to the present invention, it is possible to provide a monitoring system, which is convenient to use, and which can improve security at low cost by using an existing fixed telephone.

BRIEF DESCRIPTION OF THE SEVERAL VIEWS OF THE DRAWINGS

FIG. 10 is a schematic diagram illustrating an example of a setup table in the embodiment.

DETAILED DESCRIPTION

Hereinafter, an embodiment of the present invention will be described with reference to the drawings.

Figure 1:
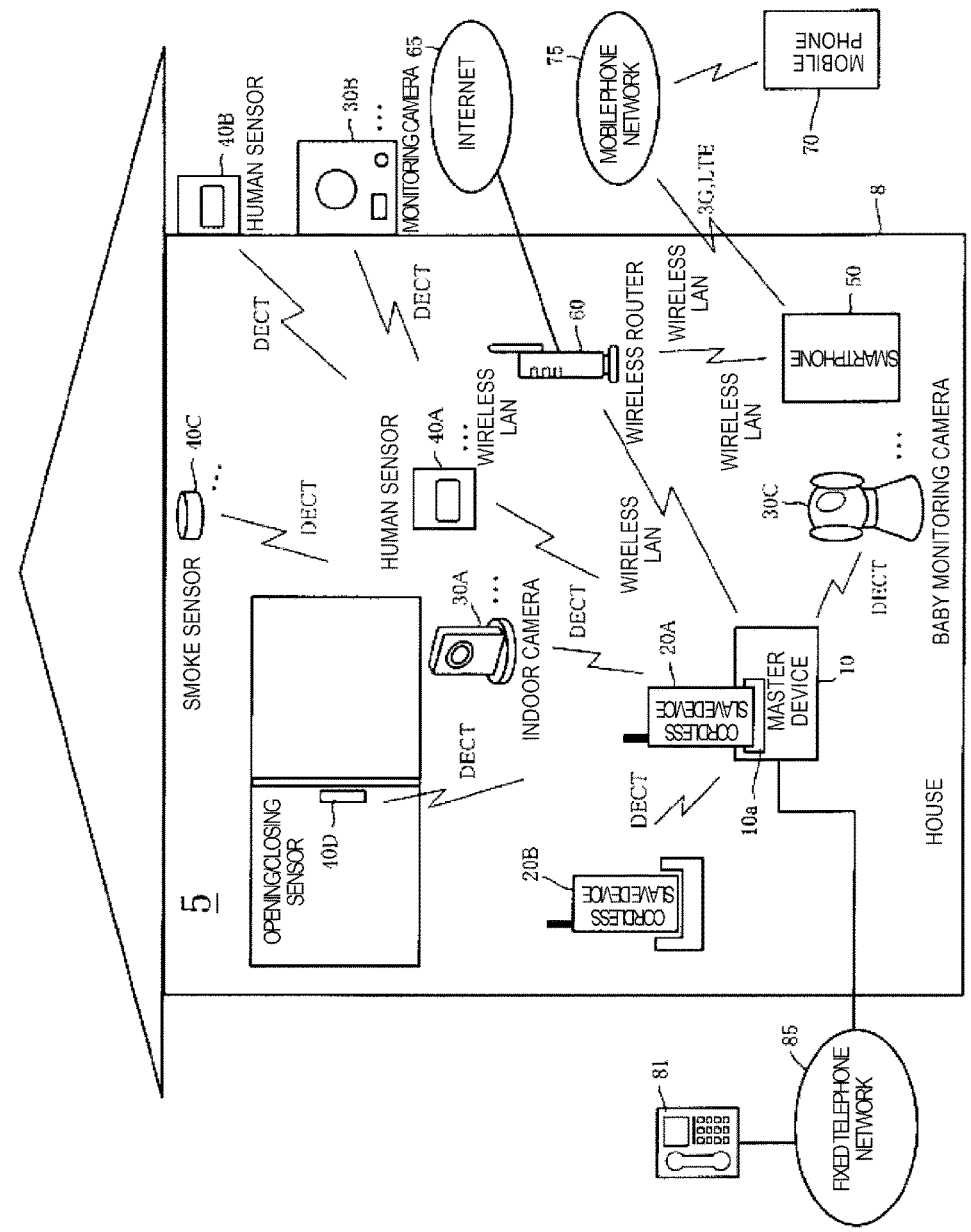
FIG. 1 is a diagram illustrating a system configuration of a monitoring camera system of an embodiment.

FIG. 1 is a diagram illustrating a system configuration of monitoring camera system 5 of the present embodiment. Monitoring camera system 5 is mainly provided in house 8, and includes master device 10, a plurality of slave devices 20A, 20B, . . . , a plurality of cameras 30 (specifically, indoor camera 30A, monitoring camera 30B, baby monitoring camera 30C, . . . ), various sensors 40 (specifically, human sensors 40A and 40B, smoke sensor 40C, and opening/closing sensor 40D), smartphone 50, and wireless router 60. A configuration of monitoring camera system 5 is only an example and may be modified in various aspects.

Master device (gateway) 10 is a control device which controls the entire operation of monitoring camera system 5, and is connected to the slave devices, the cameras, the sensors, and the like in a communicable manner by using a communication method such as digital enhanced cordless telecommunications (DECT). Master device 10 is connected to the Internet 65 (network) via wireless router 60 using a wireless LAN. Master device 10 is connected to fixed telephone network 85 in a wired manner and can perform a call to fixed telephone 81. Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, and opening/closing sensor 40D) are connected to master device 10 in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

A plurality of cameras (specifically, indoor camera 30A, monitoring camera 30B, baby monitoring camera 30C, ...) have a call function and are connected to master device 10 in the DECT communication method. Herein, as cameras, monitoring camera 30B which captures an image of an outdoor environment, indoor camera 30A which captures an image of house 8, and baby monitoring camera 30C which captures an image of a sleeping location of an infant (for example, a baby bed (not illustrated) or the vicinity thereof), are used. Particularly, in a case where the cameras are not required to be differentiated from each other, the cameras are collectively referred to as camera 30.

Smartphone 50 is connected to master device 10 via wireless router 60 using a wireless LAN. Smartphone 50 is connected to mobile phone 70 or other smartphones via mobile phone network 75 using a communication method such as the third generation (3G) method or a long term evolution (LTE) method.

Figure 2:
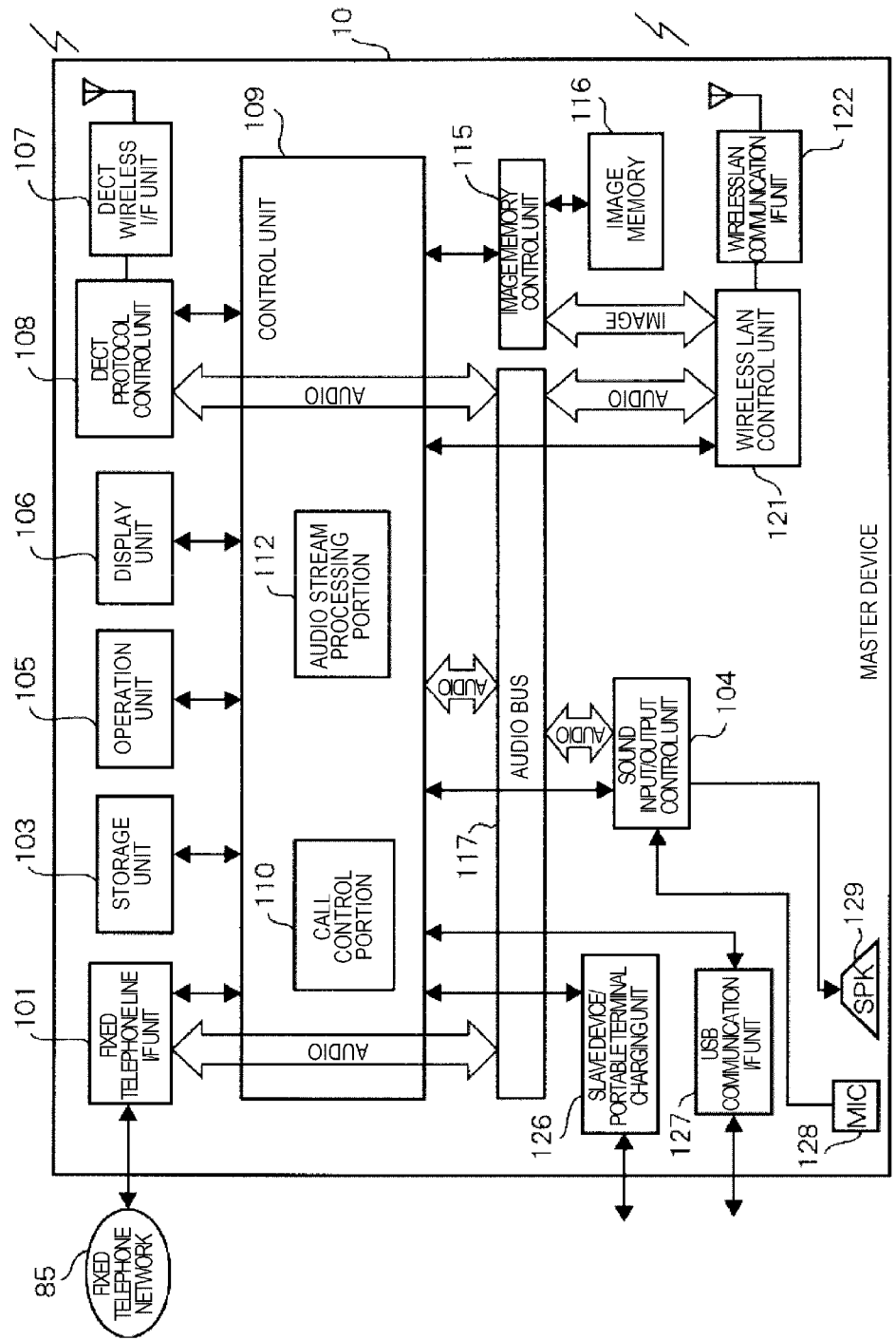
FIG. 2 is a block diagram illustrating an internal configuration of a master device of the embodiment.

FIG. 2 is a block diagram illustrating an internal configuration of master device 10. Master device 10 includes control unit 109, storage unit 103, operation unit 105, and display unit 106. Master device 10 receives various input operations and displays information such as an image on display unit 106. Control unit 109 has a call control portion 110 and an audio stream processing portion 112 built thereinto, and performs call control during calling, processing of audio data, and the like.

Master device 10 includes image memory control unit 115 and image memory 116, and stores image data or the like captured by the camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 81 connected to fixed telephone network 85.

Master device 10 includes slave device/portable terminal charging unit 126 and charges slave device 20 or smartphone 50 inserted into insertion port 10a.

Master device 10 includes USB communication I/F unit 127, and transmits and receives data to and from an apparatus, a memory, or the like having an interface of a universal serial bus (USB) standard.

Master device 10 registers various sensors 40 and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus registered in correlation with indoor camera 30A and baby monitoring camera 30C.

Figure 3:
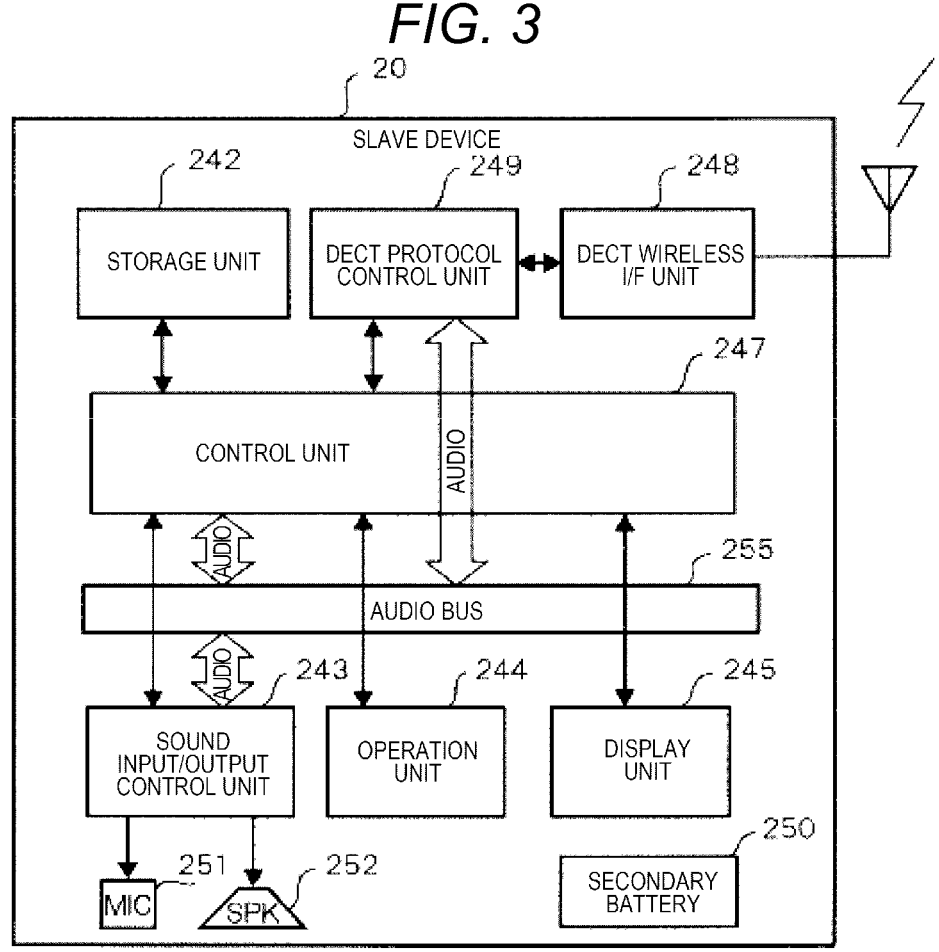
FIG. 3 is a block diagram illustrating an internal configuration of a cordless slave device of the embodiment.

FIG. 3 is a block diagram illustrating an internal configuration of slave device 20. Slave device 20 includes control unit 247, storage unit 242, operation unit 244, and display unit 245. Slave device 20 receives various input operations and displays information such as an image on display unit 245.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device.

Slave device 20 includes secondary battery 250. Secondary battery 250 is a rechargeable battery, and supplies power to each unit.

Figure 4:
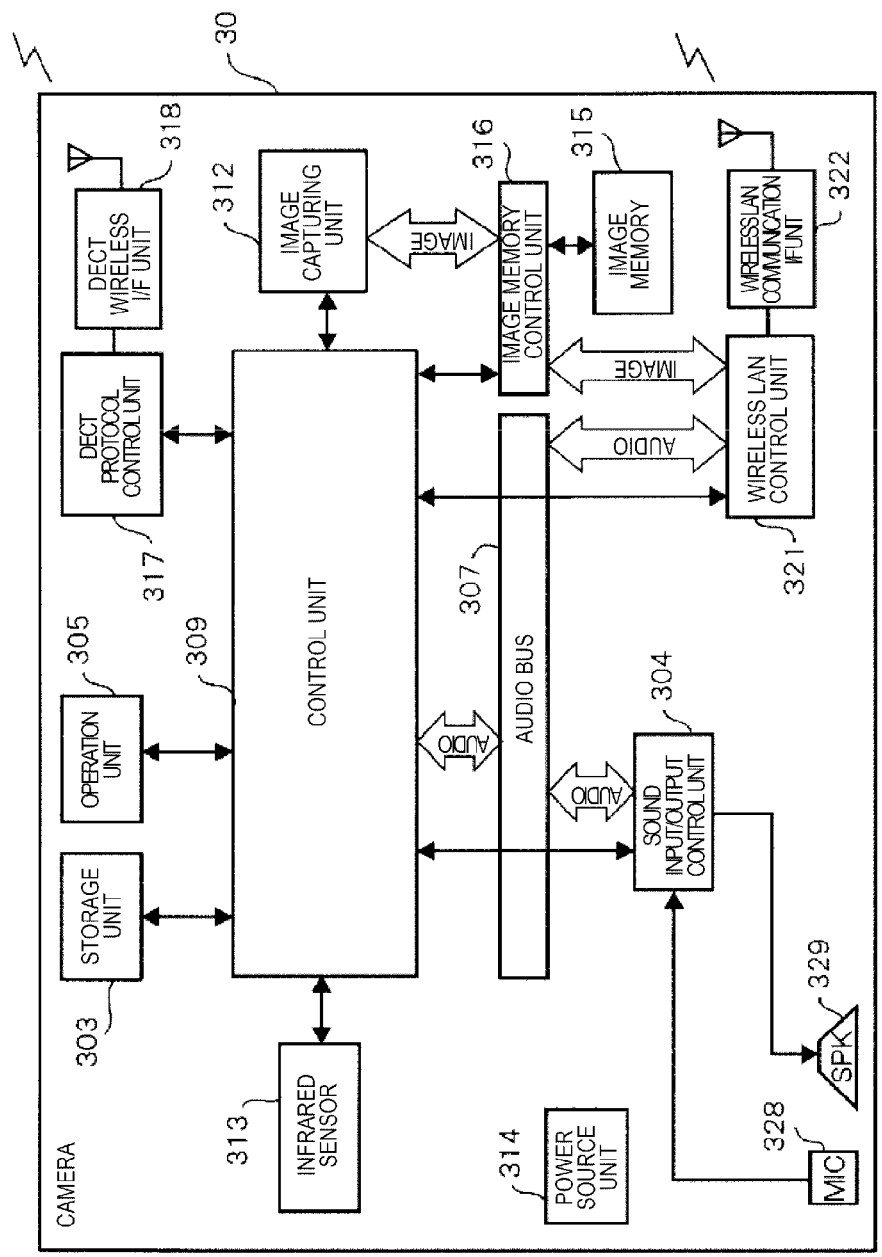
FIG. 4 is a block diagram illustrating an internal configuration of a camera of the embodiment.

FIG. 4 is a block diagram illustrating an internal configuration of camera 30. Indoor camera 30A, monitoring camera 30B, and baby monitoring camera 30C as examples of cameras 30 have substantially the same configuration as each other. Camera 30 includes control unit 309, storage unit 303, and operation unit 305. Camera 30 performs an operation related to image capturing and also receives input operations.

Camera 30 includes DECT protocol control unit 317 and DECT wireless I/F unit 318, and performs wireless connection to master device 10 by using a wireless method such as DECT.

Camera 30 includes wireless LAN control unit 321 and wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device.

Camera 30 includes image capturing unit 312, image memory control unit 316, and image memory 315, and stores image data captured by image capturing unit 312 in image memory 315. Image capturing unit 312 has a lens and an imaging element (for example, an image sensor such as a charged coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared ray) generated by the person. Camera 30 includes power source unit 314 which is constituted by a commercial AC power source.

Figure 5:
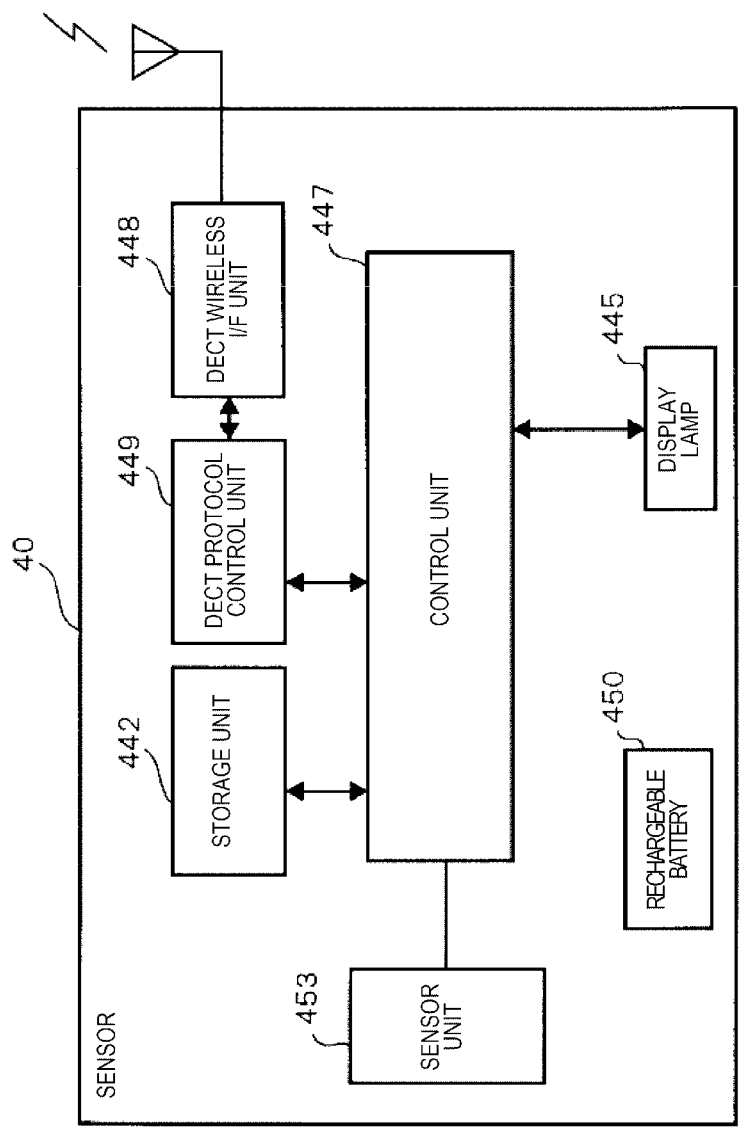
FIG. 5 is a block diagram illustrating an internal configuration of a sensor of the embodiment.

FIG. 5 is a block diagram illustrating an internal configuration of sensor 40. Sensor 40 includes control unit 447, storage unit 442, and display lamp 445. Sensor 40 performs a predetermined detection operation, such as turning on display lamp 445, in a case where a target (for example, an intruder which is also the same for the following description) is detected.

Sensor 40 includes DECT protocol control unit 449 and DECT wireless I/F unit 448, and performs wireless connection to master device 10 by using a wireless method such as DECT, and sends sensor detection information to master device 10 when a target is detected.

Sensor unit 453 differs depending on the kind of sensor 40. For example, in a case of human sensors 40A and 40B, sensor unit 453 is a PIR sensor which detects a person through a change in infrared rays. In a case of opening/closing sensor 40D which detects opening and closing of a window, or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke.

Secondary battery 450 is a rechargeable battery and supplies power to each unit.

Figure 6:
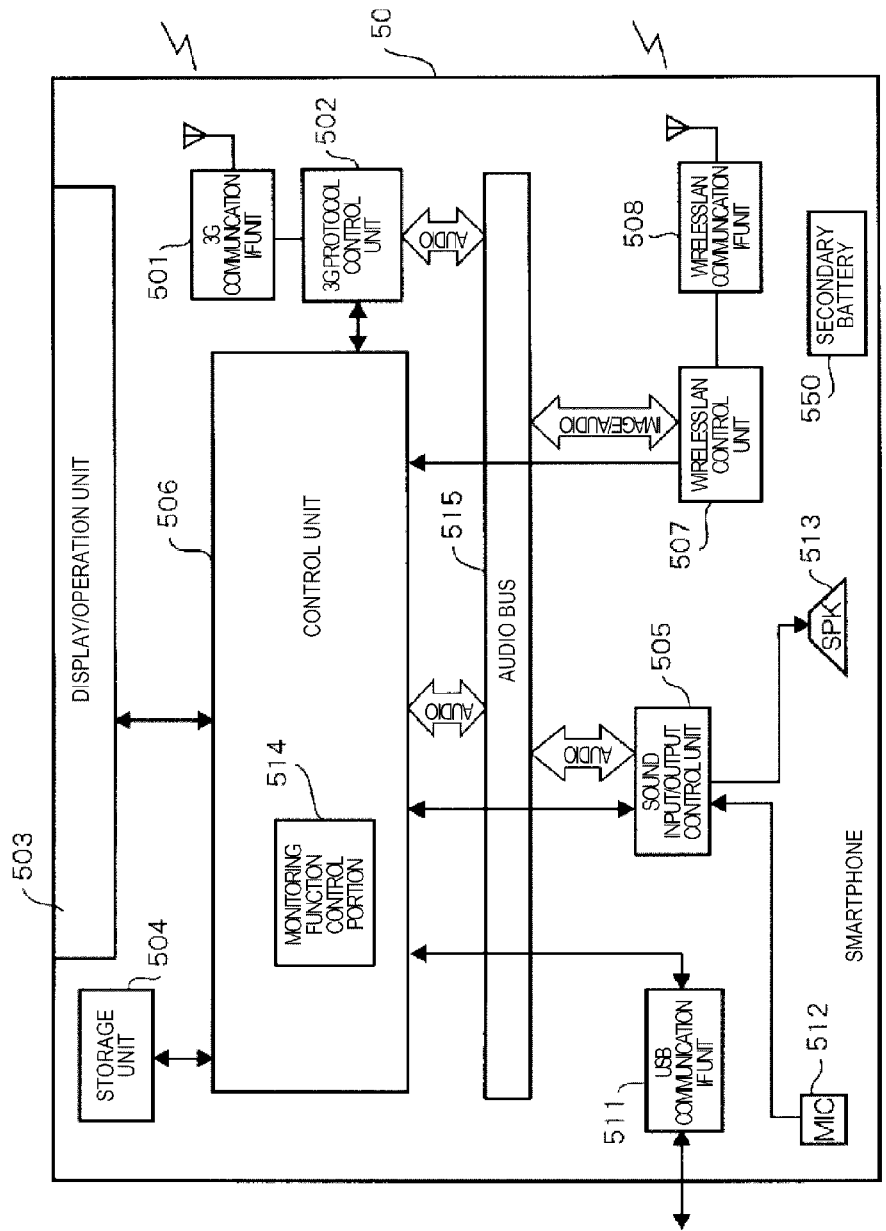
FIG. 6 is a block diagram illustrating an internal configuration of a smartphone of the embodiment.

FIG. 6 is a block diagram illustrating an internal configuration of smartphone 50. Smartphone 50 includes control unit 506, storage unit 504, and display/operation unit (touch panel) 503. Smartphone 50 receives various input operations and displays information such as an image on display/operation unit 503. A monitoring function control portion 514 which can set a function of camera 30 is built into control unit 506 as will be described later. Display/operation unit 503, which is a display/input unit into which a display unit and an operation unit are integrally formed, displays information such as an image or an icon on a screen and receives a tap operation (or a touch operation) which is performed on the screen by a user.

Smartphone 50 includes 3G protocol control unit 502 and 3G wireless I/F unit 501, and performs wireless connection to mobile phone 70 or other smartphones connected to mobile phone network 75, by using a third generation (3G) wireless communication method.

Smartphone 50 includes audio bus 515, sound input/output control unit 505, speaker 513, and microphone 512, and performs input and output of sound to and from an external device.

Smartphone 50 includes wireless LAN control unit 507 and wireless LAN communication I/F unit 508, and transmits and receives image data and audio data to and from master device 10, camera 30, and the like via wireless router 60 connected over the wireless LAN.

Smartphone 50 includes USB communication I/F unit 511, and transmits and receives data to and from an apparatus, a memory, or the like having an interface of a universal serial bus (USB) standard.

Smartphone 50 includes secondary battery 550. Secondary battery 550 is a rechargeable battery and supplies power to each unit.

Figure 7:
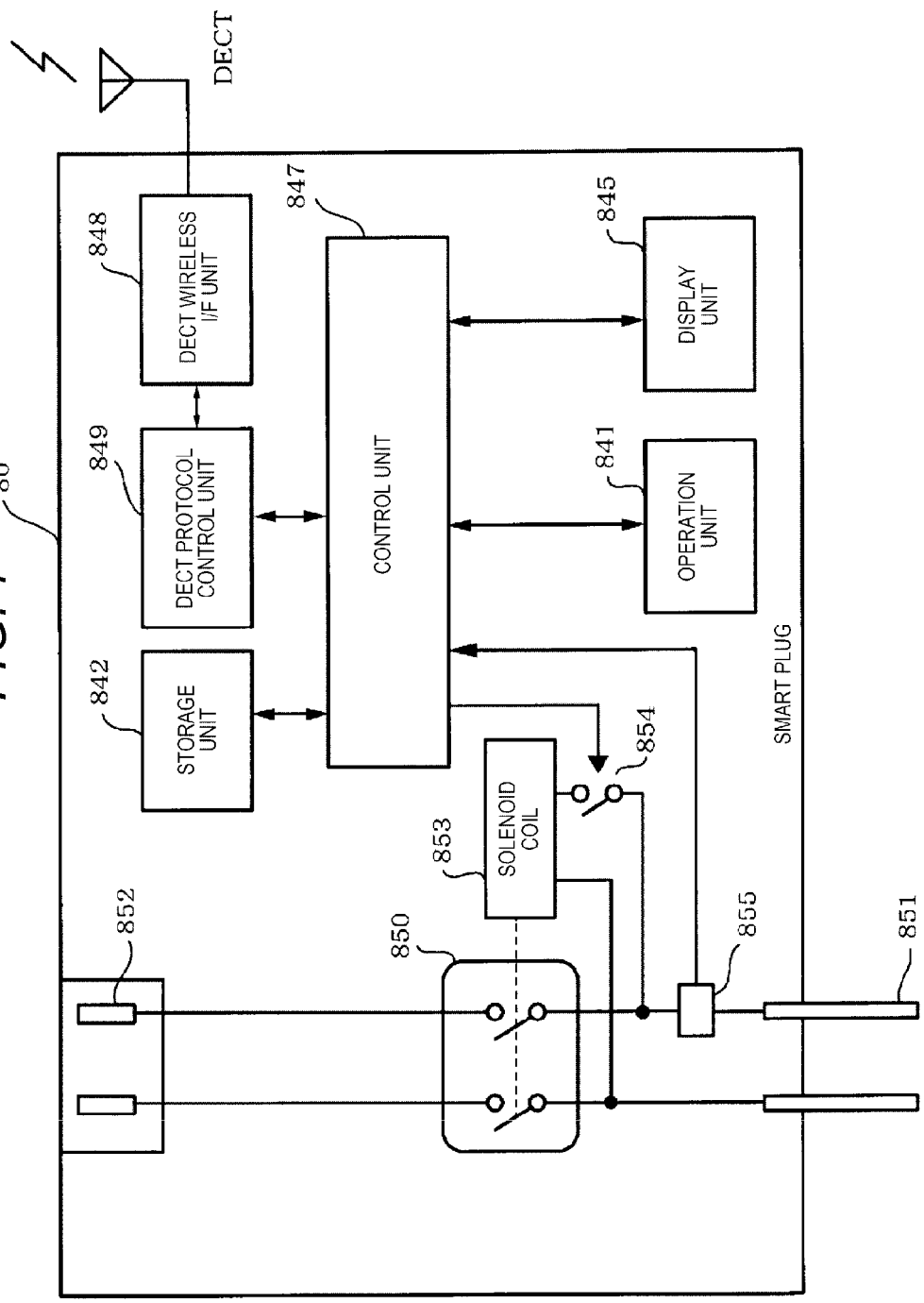
FIG. 7 is a block diagram illustrating an internal configuration of a smart plug of the embodiment.

FIG. 7 is a block diagram illustrating an internal configuration of smart plug 80. Smart plug 80 is connected to the camera or other apparatuses.

Smart plug 80 includes control unit 847, storage unit 842, and display unit 845 having a display lamp. For example, On (power supply) and Off (power supply cutoff) condition settings which can be set or changed by smart plug 80 performing communication with smartphone 50 or master device 10 are registered in storage unit 842.

Smart plug 80 includes DECT protocol control unit 849 and DECT wireless I/F unit 848, and performs wireless connection to master device 10 by using a wireless method such as DECT, and switches supply and cutoff of commercial AC power to each apparatus connected to smart plug 80.

Smart plug 80 includes switch unit 850. Switch unit 850 performs connection or disconnection between plug terminals 851 and socket terminals 852. Switch unit 850 is driven by solenoid coil 853. Switch unit 850 is closed when a driving current flows through solenoid coil 853 from an AC power source, and thus plug terminals 851 are electrically connected to socket terminals 852. A switch unit 854 causes a driving current to or not to flow through solenoid coil 853 under the control of control unit 847.

Current detection element 855 is provided between plug terminals 851 and switch unit 850. When a current flows between plug terminals 851 and socket terminals 852, current detection element 855 detects the current and sends a detection signal to control unit 847. Plug terminals 851 may be connected to various apparatuses (for example, lighting equipment, an air conditioner, and electronic apparatuses).

Next, an operation of monitoring camera system 5 will be described.

Figure 8:
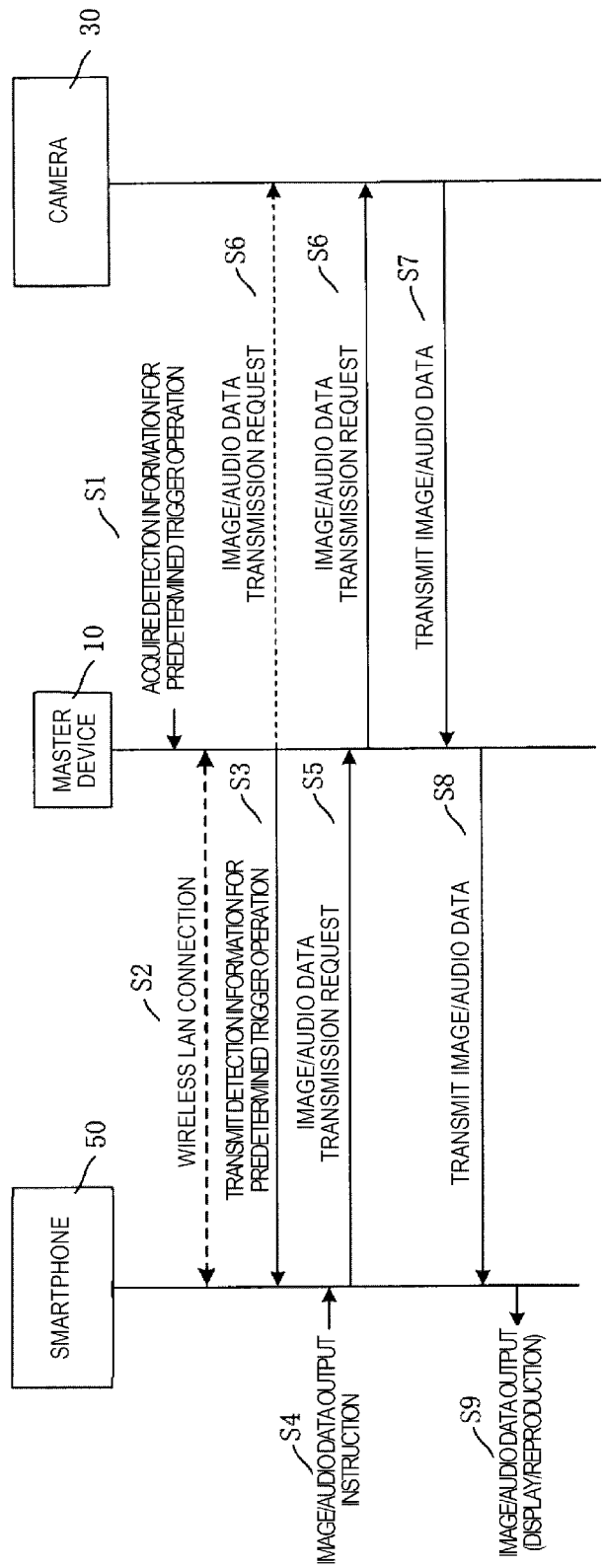
FIG. 8 is a sequence diagram illustrating an operation example of the monitoring camera system in a case where the smartphone acquires image data or audio data from the camera and then outputs the data in the embodiment.

FIG. 8 is a sequence diagram illustrating an operation example of monitoring camera system 5 in a case where smartphone 50 acquires image data or audio data from camera 30 and then outputs the data.

For example, it is assumed that a home security application corresponding to monitoring camera system 5 is installed in smartphone 50 in advance, and this application is activated by a user's input operation.

If detection information (information regarding detection performed by, for example, sensor unit 453 of each sensor 40 or infrared sensor 313 of camera 30) for a predetermined trigger operation is acquired (step S1), master device 10 performs a wireless communication connection to smartphone 50 by using a wireless LAN (step S2). If the wireless LAN connection to smartphone 50 has been completed, master device 10 transmits the detection information (refer to the above description) for the predetermined trigger operation to smartphone 50 (step S3).

If an image/audio data output instruction operation is received from the user (step S4), smartphone 50 transmits image/audio data transmission request information (step S5). If the image/audio data transmission request information is received from smartphone 50, master device 10 requests camera 30 to transmit image/audio data (step S6).

Master device 10 may transmit the detection information (refer to the above description) for the predetermined trigger operation to smartphone 50 and may also request camera 30 to transmit image/audio data (step S6).

If the image/audio data transmission request is received from master device 10, camera 30 performs a wireless communication connection to master device 10 by using the wireless LAN, and acquires image data captured by image capturing unit 312 and audio data collected by microphone 328 and transmits the data to master device 10 (step S7). Master device 10 transmits the image data and the audio data transmitted from camera 30 to smartphone 50 (step S8).

Smartphone 50 displays the image data transmitted from master device 10 on display/operation unit 503, and outputs the audio data transmitted from master device 10 from speaker 513 (step S9). Consequently, the user of smartphone 50 can display a monitoring screen including the image data from camera 30 and outputs the audio data from camera 30 as sound. The monitoring screen may include image data from the plurality of cameras 30.

Next, a description will be made of an example in which smartphone 50 sets setup information in master device 10.

Figure 9:
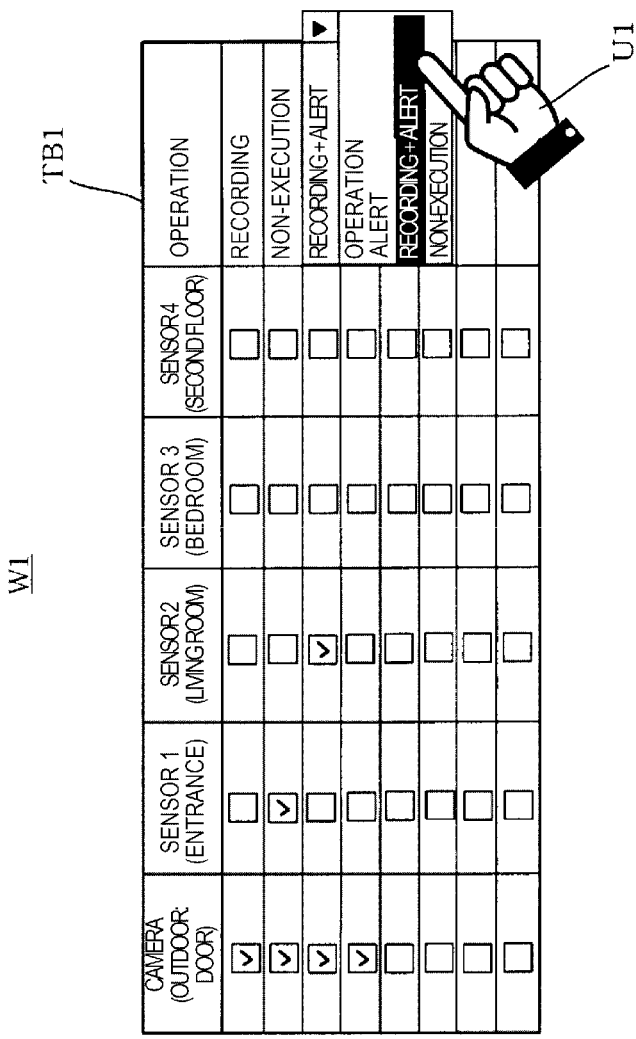
FIG. 9 is a schematic diagram illustrating an example of a setting screen of the smartphone for generating a setup table in the embodiment.

Smartphone 50 specifies an operation of master device 10 in a case where master device 10 receives sensor detection information from at least one camera 30, at least one sensor 40, or the like. Smartphone 50 receives an input operation performed on display/operation unit 503 by user U1, and generates information regarding a combination of apparatuses (camera 30 and sensor 40) which transmit sensor detection information to master device 10 and information regarding an operation of master device 10 performed on the combination as setup information (for example, setup table TB1). FIG. 9 is a schematic diagram illustrating an example of a setting screen W1 of smartphone 50 for generating setup table TB1.

Monitoring camera 30B and sensors 40 (for example, sensor 1, sensor 2, sensor 3, and sensor 4) are registered in setup table TB1 as examples of apparatuses which detect various events. Monitoring camera 30B is provided, for example, around a door used when the user gets in and out of house 8. Sensor 1 is provided at, for example, an entrance of house 8. Sensor 2 is provided in, for example, a living room of house 8. Sensor 3 is provided in, for example, a bedroom of house 8. The entrance, the living room, and the bedroom are located in the first floor. Sensor 4 is provided in, for example, at least one of rooms in the second floor of house 8. Sensors 1 to 4 may be human sensors 40A and 40B, smoke sensor 40C, and opening/closing sensor 40D, and may be other sensors. Information pieces regarding installation locations of sensors 1 to 4 are correlated with, for example, identification information pieces of sensors 1 to 4, and are held in master device 10 or the like.

In setup table TB1, as an example of an operation of master device 10, execution of recording (indicated by "recording" in FIG. 9), execution of alert (indicated by "alert" in FIG. 9), execution of recording and alert (indicated by "recording +alert" in FIG. 9), and non-execution of recording and alert (indicated by "non-execution" in FIG. 9) are set.

When the generation of the setup information has been completed, smartphone 50 transmits the setup information to master device 10. If the setup information is acquired from smartphone 50, master device 10 stores the setup information in storage unit 103. If sensor detection information indicating that various events have been detected is received from monitoring camera 30B or sensors 1 to 4, master device 10 refers to the setup information and executes an operation corresponding to a combination of an apparatus which has detected the event. FIG. 10 is a schematic diagram illustrating an example of generated setup table TB1. Events may include, for example, a person detection event, a smoke detection event, and an opening event of an entrance door or a window, and may include other events.

Master device 10 acquires sensor detection information indicating that a person has been detected from monitoring camera 30B, for example. In this case, monitoring camera 30B determines the presence or absence of a person in a captured image, for example, through a predetermined image process, and notifies master device 10 of the sensor detection information including a determination result.

Master device 10 acquires, for example, sensor detection information indicating that a person has been detected, sensor detection information indicating that smoke has been detected, or sensor detection information indicating that the entrance door or the window is open, from any one of sensors 1 to 4.

In the execution of recording as one of the operations of master device 10, master device 10 acquires and records an image captured by monitoring camera 30B which has detected an event. An image recording destination may be, for example, image memory 116 of master device 10, and may be an external recording medium using a wireless LAN.

In the execution of alert as one of the operations of master device 10, master device 10 outputs warning information. In order to output the warning information, for example, master device 10 may ring speaker 129 so as to output a predetermined warning sound (for example, a buzzer sound), and may display a warning screen on display unit 106. In order to output the warning information, for example, smartphone 50 may be notified of the warning information so that smartphone 50 outputs the warning information (for example, display of a warning screen, or output of a warning sound).

Master device 10 may cause an image captured by image capturing unit 312 of monitoring camera 30B to be included in the warning information. Master device 10 may cause audio data collected by microphone 328 of monitoring camera 30B to be included in the warning information. In this case, the user of master device 10 or smartphone 50 can rapidly check an event around the door.

In the output of warning information by master device 10 or smartphone 50, identification information (for example, a camera ID or a sensor ID) of monitoring camera 30B or sensor 40 which has detected an event may be included. Consequently, the user can understand a location (for example, the door, the entrance, the living room, the bedroom, the second floor) where the event has occurred.

In the execution of recording and alert as one of the operations of master device 10, both the operation during recording and the operation during alert are performed.

In the non-execution of recording and alert as one of the operations of master device 10, neither the operation during recording nor the operation during alert is performed.

As illustrated in FIG. 10, in setup table TB1, in a case where master device 10 does not receive sensor detection information from sensors 1 to 4 but receives sensor detection information from monitoring camera 30B, recording is performed. Consequently, for example, it is possible to check a visitor, a suspicious person, or the like around the door later.

In a case where master device 10 does not receive sensor detection information from sensors 2 to 4 but receives sensor detection information from monitoring camera 30B and sensor 1, neither recording nor alert is performed. A difference between time points at which sensor detection information pieces are received from monitoring camera 30B and sensor 1 is within a predetermined time T1 (for example, five minutes). In other words, in a case where a person is detected around the door by monitoring camera 30B, and an event is detected at the entrance by sensor 1 within the predetermined time T1, for example, this is considered as a typical behavior (regular route) of a dweller when the dweller returns home, and thus master device 10 determines that the case does not correspond to an abnormality state.

In a case where an event is detected at the entrance by sensor 1 and a person is detected around the door by monitoring camera 30B within the predetermined time T1, for example, this is considered as a typical behavior (regular route) of a dweller when the dweller is out, and thus master device 10 determines that the case does not correspond to an abnormality state in the same manner as described above. Therefore, an order of detection of an event may not be taken into consideration in determination of an abnormality state.

In a case where master device 10 does not receive sensor detection information from sensors 1, 3 and 4 but receives sensor detection information from monitoring camera 30B and sensor 2, both recording and alert are performed. A difference between time points at which sensor detection information pieces are received from monitoring camera 30B and sensor 2 is within a predetermined time T1 (for example, five minutes). In other words, in a case where a person is detected around the door by monitoring camera 30B, and an event is not detected at the entrance by sensor 1 but an event is detected at the living room by sensor 2 within the predetermined time T1, for example, this is different from a typical behavior of a dweller when the dweller returns home. For this reason, since there is a possibility that a suspicious person may enter the living room from halfway without using the regular route, master device 10 can determine that the case corresponds to an abnormality state. In this case, since recording or alert is performed, it is possible to check the suspicious person or to intimidate the suspicious person and thus to improve security.

In a case where master device 10 does not receive sensor detection information from sensors 1, 2 and 4 but receives sensor detection information from monitoring camera 30B and sensor 3, both recording and alert are performed. A difference between time points at which sensor detection information pieces are received from monitoring camera 30B and sensor 3 is within a predetermined time T1 (for example, five minutes). Here, in a case where a person is detected around the door by monitoring camera 30B, and an event is not detected at the entrance by sensor 1 but an event is detected at the bedroom by sensor 3 within the predetermined time T1, for example, this is different from a typical behavior of a dweller when the dweller returns home. For this reason, since there is a possibility that a suspicious person may enter the bedroom from halfway without using the regular route, master device 10 can determine that the case corresponds to an abnormality state. In this case, since recording or alert is performed, it is possible to check the suspicious person or to intimidate the suspicious person and thus to improve security.

In a case where master device 10 does not receive sensor detection information from sensors 1 to 3 but receives sensor detection information from monitoring camera 30B and sensor 4, both recording and alert are performed. A difference between time points at which sensor detection information pieces are received from monitoring camera 30B and sensor 4 is within a predetermined time T1 (for example, five minutes). Here, in a case where a person is detected around the door by monitoring camera 30B, and an event is not detected at the entrance by sensor 1 but an event is detected in the second floor by sensor 4 within the predetermined time T1, for example, this is different from a typical behavior of a dweller when the dweller returns home. For this reason, since there is a possibility that a suspicious person may enter the second floor from halfway without using the regular route, master device 10 can determine that the case corresponds to an abnormality state. In this case, since recording or alert is performed, it is possible to check the suspicious person or to intimidate the suspicious person and thus to improve security.

In a case where master device 10 does not receive sensor detection information from monitoring camera 30B, and sensors 1, 3 and 4 but receives sensor detection information from monitoring camera 30B and sensor 2, alert is performed. Here, in a case where a person is not detected around the door by monitoring camera 30B, and an event is suddenly detected at the living room by sensor 4, for example, this is different from a typical behavior of a dweller when the dweller returns home. For this reason, since there is a possibility that a suspicious person may enter the living room from halfway without using the regular route, master device 10 can determine that the case corresponds to an abnormality state. In this case, since alert is performed, it is possible to intimidate the suspicious person or to notify the dweller in the house or on an outing and thus to improve security.

In a case where master device 10 does not receive sensor detection information from monitoring camera 30B, and sensors 1, 2 and 4 but receives sensor detection information from monitoring camera 30B and sensor 3, alert is performed. Here, in a case where a person is not detected around the door by monitoring camera 30B, and an event is suddenly detected at the bedroom by sensor 3, for example, this is different from a typical behavior of a dweller when the dweller returns home. For this reason, since there is a possibility that a suspicious person may enter the bedroom from halfway without using the regular route, master device 10 can determine that the case corresponds to an abnormality state. In this case, since alert is performed, it is possible to intimidate the suspicious person or to notify the dweller in the house or on an outing and thus to improve security.

In a case where master device 10 does not receive sensor detection information from monitoring camera 30B, and sensors 1 to 3 but receives sensor detection information from monitoring camera 30B and sensor 4, alert is performed. Here, in a case where a person is not detected around the door by monitoring camera 30B, and an event is suddenly detected in the second floor by sensor 4, for example, this is different from a typical behavior of a dweller when the dweller returns home. For this reason, since there is a possibility that a suspicious person may enter the second floor from halfway without using the regular route, master device 10 can determine that the case corresponds to an abnormality state. In this case, since alert is performed, it is possible to intimidate the suspicious person or to notify the dweller in the house or on an outing and thus to improve security.

As mentioned above, setup table TB1 exemplifies that at least alert is performed in a case where master device 10 does not receive sensor detection information from sensor 1 but receives sensor detection information from the other sensors 2 to 4.

Figure 11:
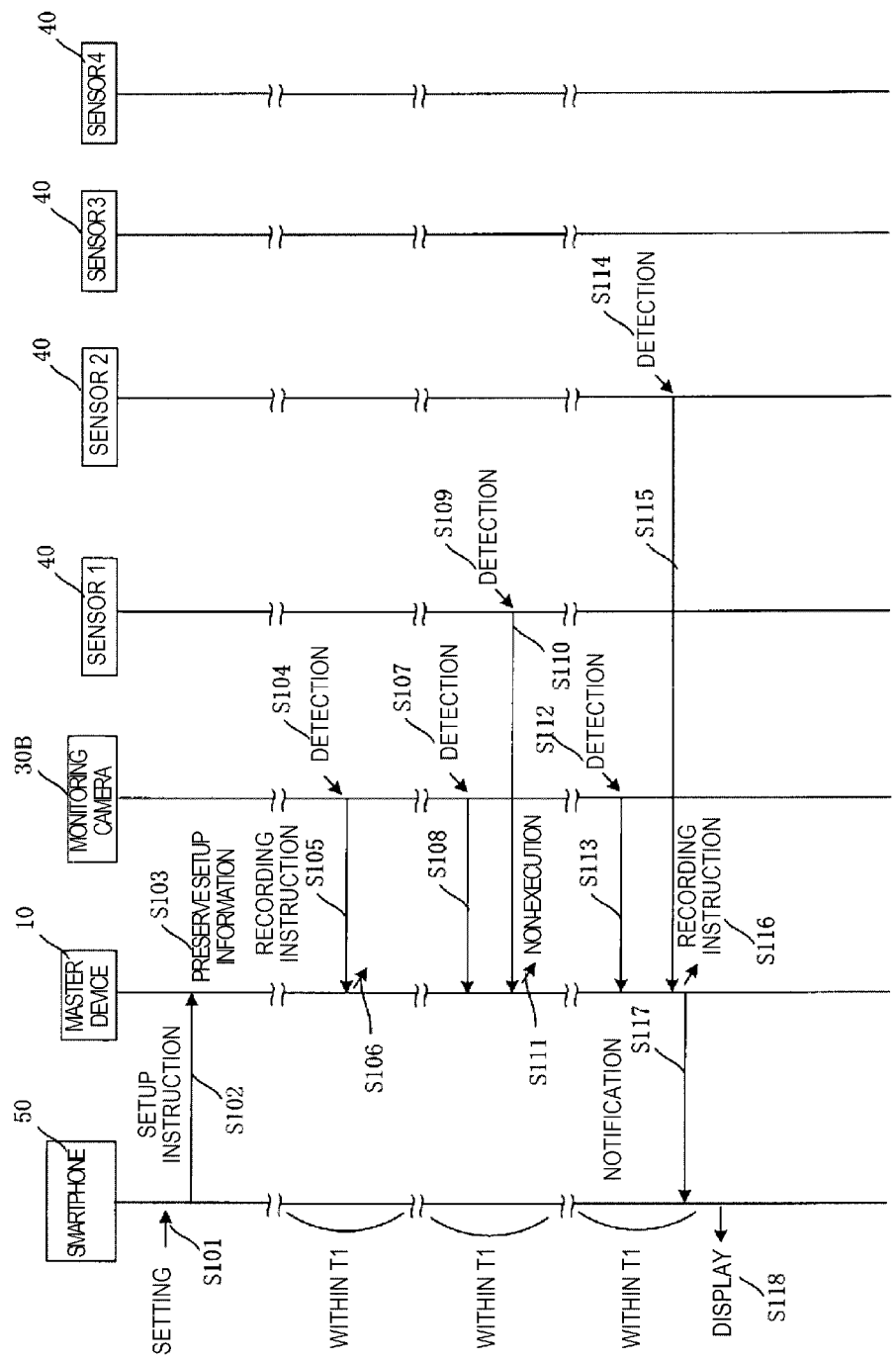
FIG. 11 is a sequence diagram illustrating an operation example of the monitoring camera system when setup information is set and various events are detected in the embodiment.

FIG. 11 is a sequence diagram illustrating an operation example of monitoring camera system 5 when setup information is set and various events are detected.

First, smartphone 50 generates setup information (for example, setup table TB1), for example, through the generation procedure illustrated in FIG. 9 (step S101), and transmits an instruction (setup instruction) for preserving the setup information in master device 10 to master device 10 (step S102). If the setup instruction is received from smartphone 50, master device 10 preserves the setup information in storage unit 103 or the like (step S103).

After the setup information is preserved in master device 10, master device 10 performs predetermined operations in relation to various events.

For example, if an event is detected (for example, person detection) (step S104), monitoring camera 30B transmits sensor detection information to master device 10 (step S105). If the sensor detection information is received from monitoring camera 30B and then other sensor detection information pieces are not received within the predetermined time T1, master device 10 refers to the setup information and performs recording (recording instruction) on the basis of the sensor detection information from monitoring camera 30B (step S106).

For example, if an event is detected (for example, person detection) (step S107), monitoring camera 30B transmits sensor detection information to master device 10 (step S108). If an event is detected (for example, person detection) (step S109), sensor 1 transmits sensor detection information to master device 10 (step S110). If the sensor detection information from monitoring camera 30B and the sensor detection information from sensor 1 are received within the predetermined time T1, master device 10 does not perform recording or alert by referring to the setup information (step S111).

For example, if an event is detected (for example, person detection) (step S112), monitoring camera 30B transmits sensor detection information to master device 10 (step S113). If an event is detected (for example, person detection) (step S114), sensor 2 transmits sensor detection information to master device 10 (step S115). If the sensor detection information from monitoring camera 30B and the sensor detection information from sensor 2 are received within the predetermined time T1, master device 10 performs recording (recording instruction) (step S116) and performs alert by referring to the setup information. In the execution of alert, master device 10 notifies, for example, smartphone 50 of the occurrence of an event or warning information (step S117), and smartphone 50 displays a warning screen based on the occurrence of the event or the warning information of which a notification has been sent (step S118).

As mentioned above, in monitoring camera system 5, for example, in a system including a plurality of sensors 40 and cameras 30, a user performs starting of recording or starting of alert in a state in which the plurality of sensors 40 or cameras 30 perform detection. In monitoring camera system 5, a combination of sensors 40 or cameras 30 which detect events for starting recording or alert may be set to be variable. Therefore, it is possible to provide a home security system which is convenient to use by using monitoring camera system 5. Particularly, it is possible not to start alert in a movement from an entrance to a living room, which is considered as a typical movement of a dweller, and thus to prevent alert having no relation to an intruder or the like.

The present invention is not limited to the configuration of the embodiment, and is applicable to any configuration which can realize functions recited in the claims or functions of the configuration of the present embodiment.

In the above-described embodiment, a single monitoring camera 30B has been exemplified as camera 30 which detects an event and is registered in setup table TB1, but a plurality of monitoring cameras 30B may be used. Camera 30 registered in setup table TB1 may be one or more cameras 30 other than monitoring camera 30B. In other words, for example, any one of rooms of house 8 may be an event detection target of indoor camera 30.

In the above-described embodiment, a description has been made of an example in which sensors 40 are provided at the entrance, the first floor, and the second floor, but sensors 40 may be provided at other locations (for example, other floors, outdoor locations (a garden or the like)).

The above-described embodiment has exemplified a combination in a case where the number sensors 40 which detect events is two or less, but a combination of three or more sensors 40 may be considered.

As mentioned above, monitoring camera system 5 includes at least one sensor 40, at least one camera 30, master device 10, and smartphone 50. Camera 30 includes microphone 328, speaker 329, and image capturing unit 312. Master device 10 can perform communication with camera 30 and sensor 40, and is connected to fixed telephone network 85 so as to perform fixed telephone 81. Smartphone 50 can perform wireless communication with master device 10 by using the wireless router, and is connected to mobile phone 70 via mobile phone network 75. Master device 10 performs recording of an image captured by camera 30 or outputting of warning information depending on whether or not an event is detected by at least two of sensors 40 and cameras 30.

Monitoring camera system 5 is an example of a monitoring system. Camera 30 is an example of a monitoring camera. Smartphone 50 is an example of a mobile phone terminal.

Consequently, a dedicated system is not necessary, and monitoring camera system 5 can be built by using existing sensor 40, camera 30, and smartphone 50.

Therefore, much labor and cost are not required to introduce monitoring camera system 5. For example, even in a case where a single sensor 40 is used and detection accuracy is low, since master device 10 operates according to a plurality of sensor detections, it is possible to improve monitoring accuracy and thus to improve security. Recording or warning information outputting is performed, and thus it is possible to check a suspicious person and to intimidate the suspicious person when and after an event occurs.

In monitoring camera system 5, smartphone 50 may generate setup information in which an operation of master device 10 is specified depending on whether or not sensor 40 and camera 30 detect an event and may transmit the setup information to master device 10. Master device 10 may receive and preserve the setup information from smartphone 50 and may operate according to the setup information.

Consequently, a user of smartphone 50 can arbitrarily set a behavior of master device 10 after an event is detected on the basis of which camera 30 or sensor 40 has detected the event.

In monitoring camera system 5, master device 10 may record an image or output warning information on the basis of an installation location of sensor 40 or camera 30 which has detected an event.

Consequently, for example, the master device can perform an appropriate monitoring operation according to a behavior of a dweller. Therefore, it is possible to improve monitoring performance and thus to improve security.

In monitoring camera system 5, master device 10 may instruct smartphone 50 to output warning information, and smartphone 50 may output the warning information in response to the instruction.

Consequently, for example, a user of smartphone 50 can recognize that an event occurs in which an intrusion of a suspicious person is suspicious during an outing or staying at home.

In monitoring camera system 5, master device 10 may be provided with display unit 106 or speaker 129 which presents warning information. Display unit 106 or speaker 129 is an example of a presentation unit.

Consequently, for example, a user of master device 10 can recognize that an event occurs in which an intrusion of a suspicious person into other rooms is suspicious during staying at home.

In monitoring camera system 5, warning information may include image data captured by camera 30 or audio data collected by camera 30.

Consequently, a user of master device 10 or smartphone 50 can rapidly check peripheral circumstances of camera 30 in which a suspicious event occurs.

What is claimed is:

1. A monitoring system comprising:
    a monitoring camera;
    a first sensor configured to detect a first event;
    a second sensor different from the first sensor and configured to detect a second event; and
    a master device that, in operation, performs wireless communication with the monitoring camera, the first sensor, and the second sensor according to a communications protocol,
    wherein the master device,
        in response to receiving setting information from a smartphone, which is communicably connected to the master device and is communicably connected to a mobile phone network to communicate with other mobile telephones, specifying the first sensor and the second sensor out of a plurality of sensors of the monitoring system based on the received setting information,
        in response to receiving a detection signal from the monitoring camera at time 1 and not receiving a detection signal from the first sensor at time 2 within a defined time period from time 1, performs at least one of recording image data captured by the monitoring camera and outputting warning information,
        in response to receiving a detection signal from the monitoring camera at time 1 and receiving a detection signal from the first sensor at time 2 within the defined time period from time 1, performs, without human intervention, neither recording image data captured by the monitoring camera nor outputting warning information, and
        in response to receiving a detection signal from the monitoring camera and receiving a detection signal from the second sensor, performs at least one of recording image data captured by the monitoring camera and outputting the warning information.

2. The monitoring system of claim 1, wherein the master device, in operation, transmits the warning information to the smartphone.

3. The monitoring system of claim 2, wherein the master device transmits the warning information, via a wireless router, to the smartphone.

4. The monitoring system of claim 1, wherein the master device includes at least one of a speaker, which audibly outputs the warning information, and a display, which visually outputs the warning information.

5. The monitoring system of claim 1, wherein the monitoring camera further includes a microphone, and the warning information includes at least one of the image data captured by the monitoring camera and audio data captured by the monitoring camera.

6. The monitoring system of claim 1,
    wherein the monitoring camera further includes a microphone, and
    the master device, when recording image data captured by the monitoring camera, acquires audio data captured by the monitoring camera.

7. The monitoring system of claim 1, wherein the first and second sensors include one or more of a human sensor, a smoke sensor, and an opening/closing sensor.

8. The home monitoring system of claim 1, wherein the first sensor is positionally associated with a location of the monitoring camera.

9. The monitoring system of claim 1, wherein the communications protocol is a DECT (Digital Enhanced Cordless Telecommunications) protocol.

10. A monitoring method based on a monitoring system, the monitoring system comprising: (a) a monitoring camera, (b) a first sensor configured to detect a first event, (c) a second sensor different from the first sensor and configured to detect a second event, and (d) a master device that, in operation, performs wireless communication with the monitoring camera, the first sensor, and the second sensor according to a communications protocol, the monitoring method comprising:
    in response to receiving setting information from a smartphone, which is communicably connected to the master device and is communicably connected to a mobile phone network to communicate with other mobile telephones, specifying the first sensor and the second sensor out of a plurality of sensors of the monitoring system based on the received setting information;
    in response to receiving a detection signal from the monitoring camera at time 1 and not receiving a detection signal from the first sensor at time 2 within a defined time period from time 1, performs at least one of recording image data captured by the monitoring camera and outputting warning information,
    in response to receiving a detection signal from the monitoring camera at time 1 and receiving a detection signal from the first sensor at time 2 within the defined time period from time 1, performing, without human intervention, neither recording image data captured by the monitoring camera nor outputting warning information, and
    in response to receiving a detection signal from the monitoring camera and receiving a detection signal from the second sensor, performing at least one of recording image data captured by the monitoring camera and outputting the warning information.

11. The monitoring method of claim 10, further comprising:
    transmitting, from the master device, the warning information to the smartphone.

12. The monitoring method of claim 11, wherein the warning information is transmitted from the master device, via a wireless router, to the smartphone.

13. The monitoring method of claim 10, further comprising:
    audibly outputting the warning information via a speaker of the master device.

14. The monitoring method of claim 10, further comprising:
    visually outputting the warning information on a display of the master device.

15. The monitoring method of claim 10, wherein the monitoring camera further includes a microphone, and the warning information includes at least one of the image data captured by the monitoring camera and audio data captured by the monitoring camera.

16. The monitoring method of claim 10, wherein the monitoring camera further includes a microphone, and the monitoring method further comprises:
    acquiring, at the master device, audio data captured by the monitoring camera when recording image data captured by the monitoring camera.

17. The monitoring method of claim 10, wherein the communications protocol is a DECT (Digital Enhanced Cordless Telecommunications) protocol.

\* \* \* \* \*